United States Patent Office 3,720,686
Patented Mar. 13, 1973

3,720,686
MERCAPTOBENZIMIDAZOLE DERIVATIVES
Venkatachala L. Narayanan, Hightstown, and Rudiger D. Haugwitz, Highland Park, N.J., assignors to E. R. Squibb & Sons, Inc., New York, N.Y.
No Drawing. Filed Apr. 1, 1971, Ser. No. 130,452
Int. Cl. C07d 49/38
U.S. Cl. 260—309.2                     6 Claims

ABSTRACT OF THE DISCLOSURE

Mercaptobenzimidazole derivatives are provided having the structure

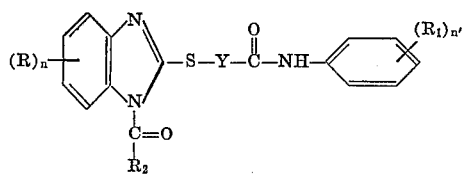

and which are useful as anthelmintic agents.

---

The present invention relates to mercaptobenzimidazole derivatives having the structure (I) 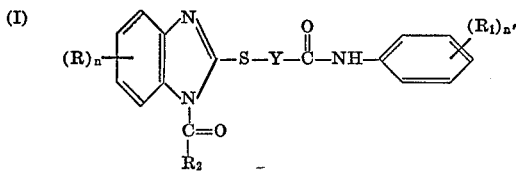

wherein R and $R_1$ are the same or different and can be hydrogen, lower alkyl, aryl, aralkyl, lower alkoxy, acyl, aroyl, lower alkylaryl, lower alkylthio, trifluoromethyl, nitro, halogen, cyano, thiocyanato, amido, substituted amino, dialkylaminoalkyl or alkyloxy- or aryloxycarbonyl

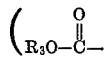

wherein $R_3$ can be hydrogen, lower alkyl, or lower alkylaryl; Y is a straight or branched chain alkylene radical containing from one to about fifteen carbon atoms; $R_2$ can be lower alkoxy, cycloalkoxy, arylalkoxy, or aryloxy; $n$ is 0, 1 or 2 and $n'$ is 0, 1 or 2.

Where more than one R and/or $R_1$ radical is present, they may be the same or different.

The lower alkyl groups represented by the above R, $R_1$, $R_2$ and $R_3$ groups include straight or branched chain aliphatic hydrocarbon radicals having up to and including seven carbon atoms, such as methyl, ethyl, propyl, isopropyl, butyl, s-butyl, isobutyl, t-butyl, amyl, hexyl, heptyl, and the like.

The alkylene group represents a divalent straight or branched chain aliphatic hydrocarbon and can contain from one to fifteen carbon atoms in a chain with or without side chains. The side chains can include cycloalkyl substituents which correspond to the cycloalkoxy groups set out below. Examples of these groups include groups corresponding to the above alkyl groups as well decylene, undecylene, dodecylene, tridecylene, tetradecylene, pentadecylene, 3-(cyclobutylmethyl)butylene and 2-cyclopropyl hexylene.

The lower alkoxy group and the alkoxy portion of the arylalkoxy and alkoxycarbonyl groups include straight and branched chain radicals of up to and including seven carbon atoms, corresponding to the above alkyl groups, e.g., methoxy, ethoxy, propoxy, isopropoxy, and the like. The aryloxy group and that portion of the aryloxycarbonyl groups include any of the aryl groups set out below.

The cycloalkoxy groups can contain from three to about seven carbon atoms and include cyclopropoxy, cyclobutoxy, cyclopentoxy, cyclohexoxy and cycloheptoxy.

The term "halogen" includes each of the four halogens, but fluorine and chlorine are preferred.

The substituted amino groups include mono- or dilower alkyl- or arylamino where lower alkyl and aryl are as defined herein, such as methylamino, ethylamino, isopropylamino, heptylamino, dimethylamino, diethylamino, ethylmethylamino, butylmethylamino, ethyl i-propylamino, anilino, diphenylamino, naphthylamino, or N-methyl-N-phenylamino and the like.

The term "amido" represents radicals of the structure

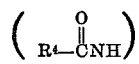

wherein $R^4$ is alkyl or aryl as defined herein.

The term "aryl" includes monocyclic or bicyclic monovalent aromatic ring systems such as phenyl or naphthyl. These aryl radicals can include as substituents halogen, nitro or any of the alkyl groups mentioned hereinbefore.

The acyl and aroyl groups included herein are derived from hydrocarbon carboxylic acid of less than twelve carbon atoms, which may be exemplified by the lower alkanoic acids (e.g., formic, acetic, propionic, butyric, valeric, adamantane acetic and caproic acids), the lower alkenoic acids (e.g. acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

Preferred are those compounds wherein R is hydrogen, $R_1$ is 4—Cl, 4—$CH_3$, 4—$NO_7$ or H, Y is —$CH_2$— and $R_2$ is $C_2H_5O$.

Examples of compounds falling within the present invention include, but are not limited to, the following set out in Table A.

TABLE A

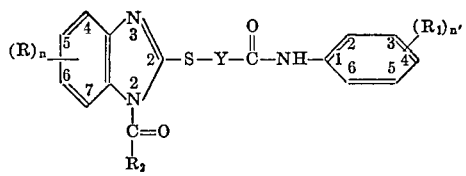

| R (position) | n | R₂ | Y | R₁ (position) | n' |
|---|---|---|---|---|---|
| 1 ........... H | ..... | $C_2H_5O-$ | $CH_2$ | Cl (4) | 1 |
| 2 ........... H | ..... | $C_2H_5O-$ | $CH_2$ | $CH_3$ (4) | 1 |
| 3 ........... H | ..... | $C_2H_5O-$ | $CH_2$ | $NO_2$ (4) | 1 |
| 4 ........... $NO_2$ (5) | 1 | $C_2H_5O-$ | $CH_2$ | H | ..... |
| 5 ........... H | ..... | $C_2H_5O-$ | $CH_2$ | H | ..... |
| 6 ........... H | ..... | $C_6H_5CH_2O-$ | $CH_2$ | $NO_2$ (3) | 1 |
| 7 ........... $CH_3$ (6) | 1 | $C_3H_7O-$ | $(CH_2)_3$ | $C_6H_5$ (3) | 1 |
| 8 ........... t-$C_4H_9$ (5) | 1 | $C_4H_9O-$ | $(CH_2)_4$ | $C_6H_5CH_2$ (4) | 1 |
| 9 ........... $CH_3O$ (6) | 1 | 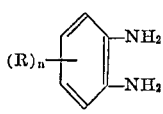 | $-CH-CH_2-$<br>$\;\;\;\;\|$<br>$\;\;\;CH_3$ | $CH_3$ (3)<br>$CH_3$ (5) | 2 |
| 10 ........... $\{CH_3\;(6)\atop CH_3\;(7)\}$ | 2 | 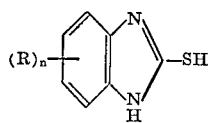 | $-CH_2-CH-(CH_2)_2-$<br>$\;\;\;\;\;\;\;\;\;\;\;\;\;\|$<br>$\;\;\;\;\;\;\;\;\;\;CY_3$ | OH (4) | 1 |
| 11 ........... $C_4H_9S$ (4) | 1 | $C_5H_{11}O-$ | $(CH_2)_7$ | $CF_3$ (3) | 1 |
| 12 ........... $\{Cl\;(5)\atop Cl\;(6)\}$ | 2 | 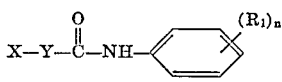 | $(CH_2)_{11}$ | Cl (3)<br>Cl (5) | 2 |
| 13 ........... NCS— (6) | 1 | $C_6H_{13}O-$ | $(CH_2)_{14}$ | $NH_2$ (4) | 1 |
| 14 ........... $C_2H_5O-\overset{O}{\underset{\|}{C}}-$ (5) | 1 | $C_4H_9O-$ | $(CH_2)_5$ | CN (2) | 1 |
| 15 ........... $CF_3$ (6) | 1 | $C_7H_{15}O-$ | $(CH_2)_{11}$ | $C_3H_7O\overset{O}{\underset{\|}{C}}$ (3) | 1 |
| 16 ........... $(CH_3)_2N$ (4) | 1 | $CH_3O-$ | $-(CH_2)_2-CH-(CH_2)_4-$<br>$\;\;\;\;\;\;\;\;\;\;\;\;\;\;\;\;\|$<br>$\;\;\;\;\;\;\;\;\;\;\;\;\;C_2H_5$ | NCS— (2) | 1 |
| 17 ........... $C_2H_5\diagdown\atop C_3H_7\diagup N-CH_2-$ (6) | 1 | [S]—O— | $\;\;\;\;\;\;\;\;\;\;\;CH_3$<br>$\;\;\;\;\;\;\;\;\;\;\;\|$<br>$-CH_2-C-(CH_2)_3-$<br>$\;\;\;\;\;\;\;\;\;\;\;\|$<br>$\;\;\;\;\;\;\;\;\;\;\;CH_3$ | $C_6H_5$ (4) | 1 |

Compounds of Formula I can be prepared by reacting an o-phenylenediamine II (II)

$(R)_n$—[benzene ring]—$NH_2$ / $NH_2$ with, for example, potassium ethyl xanthate in accordance with the procedure described in "Organic Syntheses," vol. IV, page 569, employing a molar ratio of II:xanthate within the range of from about 1:1 to about 1:1.2 to form a mercaptobenzimidazole III (III)

$(R)_n$—[benzimidazole]—SH

Mercaptobenzimidazole III is reacted with a haloacid anilide IV (IV)

$X-Y-\overset{O}{\underset{\|}{C}}-NH-$[phenyl]—$(R_1)_n$ wherein X can be Cl or Br in a molar ratio of III:IV within the range of from about 0.9:1 to about 1.5:1 and preferably about 1:1 to form a thioanilide of the structure V (V) 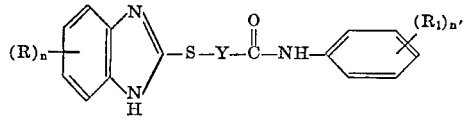

In reacting compounds III and IV protic or aprotic solvents such as alkanols, for example methanol or ethanol, acetone, benzene or tetrahydrofuran are employed. The reaction is carried out at a temperature within the range of from about 0 to about 120° C., preferably from about 30 to about 80° C., for periods ranging from about 30 minutes to about 24 hours, in the presence of a basic catalyst such as triethylamine, pyridine, sodium hydroxide, or potassium hydroxide.

Compound V is reacted with an excess of halocarbonic acid ester VI (VI)  $R_2COX$ wherein X is Cl or Br to form compounds of the structure I. The latter reaction is carried out employing a molar ratio of VI:V within the range of from about 1:1 to about 100:1 and preferably from about 1:1 to about 10:1 in the presence of a basic catalyst like pyridine, triethylamine, N,N-dimethylaniline or N-ethylpiperidine and solvents such as esters, for example ethyl acetate; ethers such as tetrahydrofuran, ketones, for example ethylmethyl ketone and aromatic hydrocarbon, for example benzene, toluene or xylene. The reaction is carried out at a temperature within the range of from about 0 to about 120° C. and preferably from about 25 to about 80° C. for periods ranging from about 15 minutes to about 8 hours.

Examples of suitable starting o-phenylenediamines II are set out in Table B below.

TABLE B

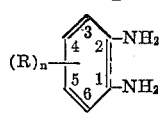

| | R (position) | n |
|---|---|---|
| 1 | H | |
| 2 | $C_6H_5\overset{O}{\underset{\|}{C}}-$ (4) | 1 |
| 3 | $CH_3\overset{O}{\underset{\|}{C}}$ (4, 5) | 2 |
| 4 | $C_2H_5O-$ (5) | 1 |
| 5 | $CH_3\overset{O}{\underset{\|}{C}}-NH-$ | 1 |
| 6 | $CH_3NH-$ (6) | 1 |
| 7 | $(C_4H_9)_2N-$ (4) | 1 |
| 8 | $(C_2H_5)_2NCH_2-$ (5) | 1 |
| 9 | $C_6H_5O\overset{O}{\underset{\|}{C}}-$ (4) | 1 |
| 10 | $CF_3$ (5) | 1 |
| 11 | $\{CH_3S$ (3), $C_2H_5$ (5)$\}$ | 2 |
| 12 | $C_4H_9$ (5) | 1 |
| 13 | $NO_2$ (5) | 1 |
| 14 | $-SCN$ (6) | 1 |
| 15 | $Cl$ (4, 5) | 2 |
| 16 | $C_6H_5CH_2-$ (4) | 1 |
| 17 | $-CH$ (5, 6) | 2 |
| 18 | $C_6H_5$ (3) | 1 |
| 19 | $p-CH_3-C_6H_4-$ (4) | 1 |

Examples of suitable haloacid anilides IV are set out below in Table C.

TABLE C

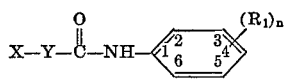

| | X | Y | $R_1$ | n |
|---|---|---|---|---|
| 1 | Cl | $CH_2$ | $C_2H_5$ (4) | 1 |
| 2 | Br | $(CH_2)_2$ | $C_3H_7O-$ (3) | 1 |
| 3 | Cl | $(CH_2)_4$ | Br (4) | 1 |
| 4 | Br | $(CH_2)_8$ | $C_6H_5O\overset{O}{\underset{\|}{C}}$ (4) | 1 |
| 5 | Cl | $(CH_2)_{10}$ | $(C_4H_9)_2NC_3H_6$ (4) | 1 |
| 6 | Cl | $(CH_2)_{15}$ | $-SCN$ (2) | 1 |
| 7 | Br | $-CH_2-\overset{CH_3}{\underset{\|}{CH}}-(CH_2)_3-$ | $CH_3-\underset{}{\bigcirc}-$ (4) | 1 |
| 8 | Cl | $-(CH_2)_3-\overset{}{\underset{CH_3}{CH}}-$ | $CH_3-CONH$ (3), $CH_3$ (4) | 2 |
| 9 | Cl | $-(CH_2)_2-\overset{CH_3}{\underset{\|}{CH}}-$ | Cl (3), Cl (5) | 2 |
| 10 | Br | $(CH_2)_2$ | $CF_3$ (4), $CH_3$ (5) | 2 |

The haloacid anilides IV can be prepared by standard procedures involving the interaction of anilines with haloacid chlorides as described by E. K. Harvill et al., J. Org. Chem., 17 (1952), page 1597.

Examples of suitable halocarbonic acid esters of structure VI are set out in Table D below.

TABLE D
$R_2COX$

| | $R_2$ | X |
|---|---|---|
| 1 | $CH_3O-$ | Cl |
| 2 | $C_4H_9O-$ | Cl |
| 3 | $C_6H_{13}O-$ | Br |
| 4 | 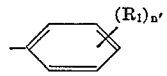 | Cl |
| 5 | $C_6H_5C_2H_4O$ | Br |
| 6 |  | Cl |
| 7 | 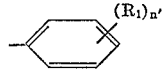 | Cl |

The intermediates of structure V are new compounds where R is other than hydrogen or when R is hydrogen, the $$\underset{}{\bigcirc}(R_1)_{n'}$$

group is other than phenyl, alkylphenyl, alkoxyphenyl or aminophenyl. Examples of these compounds correspond to those set out in Table A and in the working examples wherein R is other than hydrogen and $$\overset{O}{\underset{\|}{C}}-R_2$$

is replaced by hydrogen and where R is hydrogen, $$\overset{O}{\underset{\|}{C}}-R_2$$

is replaced by hydrogen and the $$\underset{}{\bigcirc}(R_1)_{n'}$$

group is other than phenyl, alkylphenyl, alkoxyphenyl or aminophenyl.

The mercaptobenzimidazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersible, wettable powder containing the anthelmintic agent may be added to the drinking water of the animals.

The preferred dosage level for treating a helminth infection will depend to a large extent on the particular mercaptobenzimidazole compound being employed, on the severity of the infection and on the particular species of animal to be treated. In general, the mercaptobenzimidazoles exhibit anthelmitic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The mercaptobenzimidazoles may be incorporated in the animal feeds, and this method of administration is preferred when the compounds are to be used prophylactically, in which case they are incorporated in the feeds at concentrations such that the animal will consume daily from about 10 to about 70 mg. of mercaptobenzimidazole per kilogram of body weight.

The means employed for administering these mercaptobenzimidazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the mercaptobenzimidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ blouses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the mercaptobenzimidazoles are mixed with a suspending agent such as bentonite and the solid product added to water just prior to administration. The preferred drenches in accordance with this invention contain from about 5–50% by weight of mercaptobenzimidazole compound.

The mercaptobenzimidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the mercaptobenzimidazoles intimately dispersed in or admixed with an inert carrier or diluent, i.e. one that is nonreactive with respect to the mercaptobenzimidazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate mercaptobenzimidazole with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.12–2.0% in the feed. One advantageous method of administering the compounds of this invention to animals whose feeds are conveniently pelleted, such as sheep, is to incorporate them directly in the pellets. For instance, mercaptobenzimidazole is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the mercaptobenzimidazoles may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

2[[[(p-chlorophenyl)carbamoyl]methyl]thio]-benzimidazole-1-carboxylic acid, ethyl ester Step A: 2 - (2 - benzimidazolylthio)-4'-chloroacetanilide.—A solution of 15.0 g. (0.10 mole) of 2-mercaptobenzimidazole, 20.3 g. (0.10 mole) of 4-chloro-α-chloracetanilide and 12.1 g. (0.12 mole) of triethylamine in 800 ml. of tetrahydrofuran is refluxed for 4 hours. The solvent is removed in vacuo and the solid crystallized from dilute methanol to give 19.9 g. of 2-(2-benzimidazolylthio)-4'-chloracetanilide, M.P. 198.5–200°.

*Analysis.*—Calcd. for $C_{15}H_{12}ClN_3OS$ (percent): C, 56.70; H, 3.80; N, 13.22. Found (percent): C, 56.43; H, 4.09; N, 13.11.

Step B: 2 - [[[(p - chlorophenyl)carbamoyl]methyl]thio]-benzimidazole - 1 - carboxylic acid, ethyl ester.—A slurry of 3.6 g. (0.013 mole) of 2-(2-benzimidazolylthio)-4'-chloracetanilide, 1.15 g. (0.013 mole) of triethylamine and 50 ml. of ethyl chloroformate is stirred at room temperature for 15 minutes. The solid that separates is collected, washed with ether and crystallized from dilute methanol to give 1.5 g. of 2-[[[(p-chlorophenyl)carbamoyl]methyl]thio]benzimidazole - 1 - carboxylic acid, ethyl ester as white crystals, M.P. 175–176.5°.

*Analysis.*—Calcd. for $C_{18}H_{16}ClN_3O_3S$ (percent): C, 55.44; H, 4.14; N, 10.77. Found (percent): C, 55.49; H, 4.43; N, 10.70.

EXAMPLE 2

2[[(p-toluylcarbamoyl)methyl]thio]-1-benzimidazole-carboxylic acid, ethyl ester

Step A: 2 - (2-benzimidazolylthio)-p-acetotoluidide.— Following the procedure of Example 1, Step A, but substituting an equivalent amount of 4-methyl-α-chloroacetanilide for 4-chloro-α-chloroacetanilide, there is obtained 2-(2 - benzimidazolylthio) - p - acetotoluidide, M.P. 184–185°.

*Analysis.*—Calcd. for $C_{16}H_{15}N_3OS$ (percent): C, 64.62; H, 5.08; N, 14.13. Found (percent): C, 64.79; H, 5.21; N, 13.84.

Step B: 2-[[(p-toluylcarbamoyl)methyl]thio]-1-benzimidazolecarboxylic acid, ethyl ester.—Following the procedure of Example 1, Step B, but substituting an equivalent amount of 2-(2-benzimidazolylthio)-p-acetotoluidide for 2-(2-benzimidazolylthio) - 4' - chloracetanilide, there is obtained 2-[[(p-toluylcarbamoyl)methyl]thio]-1-benzimidazolecarboxylic acid, ethyl ester, M.P. 196–197°.

*Analysis.*—Calcd. for $C_{19}H_{19}N_3O_3S$ (percent): C, 61.78; H, 5.19; N, 11.38. Found (percent): C, 61.55; H, 5.43; N, 11.09.

EXAMPLE 3

2-[[[(p-nitrophenyl)carbamoyl]methyl]thio]-1-benzimidazolecarboxylic acid, ethyl ester Step A: 2-(2-benzimidazolylthio)-4'-nitroacetanilide.— Following the procedure of Example 1, Step A, but substituting an equivalent amount of 4-nitro-α-chloroacetanilide for 4-chloro-α-chloroacetanilide, there is obtained 2-(2-benzimidazolylthio)-4'-nitroacetanilide, M.P. 198–199°.

*Analysis.*—Calcd. for $C_{15}H_{12}N_4O_3S$ (percent): C, 54.86; H, 3.69; N, 17.06. Found (percent): C, 54.65; H, 3.80; N, 16.88.

Step B: [[[(p-nitrophenyl)carbamoyl]methyl]thio]-1-benzimidazolecarboxylic acid, ethyl ester.—Following the procedure of Example 1, Step B, but substituting an equivalent amount of 2-(2-benzimidazolylthio)-4'-nitroacetanilide for 2-(2-benzimidazolylthio)-4'-chloroacetanilide, there is obtained 2-[[[(p - nitrophenyl)carbamoyl]methyl]thio]-1-benzimidazolecarboxylic acid, ethyl ester, M.P. 186.5–188°.

*Analysis.*—Calcd. for $C_{18}H_{16}N_4O_5S$ (percent): C, 54.00; H, 4.03; N, 13.99. Found (percent): C, 53.86; H, 4.04; N, 13.76.

EXAMPLE 4

2-[[(phenylcarbamoyl)methyl]thio]-5-nitro-1-benzimidazolecarboxylic acid, ethyl ester Step A: 2-[(5 - nitro - 2 - benzimidazolyl)thio]acetanilide.—Following the procedure of Example 1, Step A, but substituting an equivalent amount of 5-nitro-2-mercaptobenzimidazole for 2-mercaptobenzimidazole, and α-chloroacetanilide for 4-chloro-α-chloracetanilide, there is obtained 2 - [(5 - nitro-2-benzimidazolyl)thio]acetanilide, M.P. 105–110°.

*Analysis.*—Calcd. for $C_{15}H_{12}N_4O_3S$ (percent): C, 54.86; H, 3.60; N, 17.06. Found (percent): C, 54.87; H, 3.74; N, 17.02.

Step B: 2-[[phenylcarbamoyl)methyl]thio] - 5 - nitro-1-benzimidazolecarboxylic acid, ethyl ester.—Following the procedure of Example 1, Step B, but substituting an equivalent amount of 2-[(5-nitro-2-benzimidazolyl)thio]acetanilide for 2-(2-benzimidazolylthio)-4'-chloracetanilide, there is obtained 2-[[(phenylcarbamoyl)methyl]thio]-5-nitro-1-benzimidazolecarboxylic acid, ethyl ester.

EXAMPLE 5

2-[[(phenylcarbamoyl)methyl]thio]-1-benzimidazolecarboxylic acid, ethyl ester

Step A: 2-(2-benzimidazolylthio)acetanilide.—To a solution of 10 g. (0.073 mole) of 2-mercaptobenzimidazole and 10 g. of potassium hydroxide in a mixture of 20 ml. of ethyl alcohol and 10 ml. of water, 11.87 g. (0.073 mole) of α-chloracetanilide is added and the mixture is refluxed for 0.5 hr. The reaction mixture is cooled, diluted with water, and the precipitated solid is collected. It is crystallized from dilute methanol and dried over $P_2O_5$ at 100° to give 2 - (2-benzimidazolylthio)acetanilide, M.P. 202.5–204.5.

*Analysis.*—Calcd. for $C_{15}H_{13}N_3OS$ (percent): C, 63.59; H, 4.60; N, 14.83. Found (percent): C, 63.79; H, 4.77; N, 14.62.

Step B: 2-[[(phenylcarbamoyl)methyl]thio]-1-benzimidazole-carboxylic acid, ethyl ester.—Following the procedure of Example 1, Step B, but substituting an equivalent amount of 2-(2-benzimidazolylthio)acetanilide for 2-(2-benzimidazolylthio)-4'-chloracetanilide, there is obtained 2-[[(phenylcarbamoyl)methyl]-thio] - 1 - benzimidazolecarboxylic acid, ethyl ester.

EXAMPLE 6

2-[[[(m-nitrophenyl)carbamoyl]methyl]thio]-benzimidazole-1-carboxylic acid, ethyl ester Step A: 2-(2-benzimidazolylthio)-3'-nitroacetanilide.— Following the procedure of Example 5, Step A, but substituting an equivalent amount of 3-nitro-α-chloroacetanilide for α-chloracetanilide, there is obtained 2-(2-benzimidazolylthio)-3'-nitroacetanilide, M.P. 218–219°.

*Analysis.*—Calcd. for $C_{15}H_{12}O_3SN_4$ (percent): C, 54.87; H, 3.68; N, 17.07. Found (percent): C, 54.62; H, 3.73; N, 16.90.

Step B: 2-[[[(m-nitrophenyl)carbamoyl]methyl]thio]-benzimidazole-1-carboxylic acid, ethyl ester.—Following the procedure of Example 1, Step B, but substituting an equivalent amount of 2-(2-benzimidazolylthio)-3'-nitroacetanilide for 2-(2-benzimidazolylthio)-4'-chloroacetanilide, there is obtained 2-[[[(m-nitrophenyl)carbamoyl]methyl]thio]-benzimidazole-1-carboxylic acid, ethyl ester.

EXAMPLES 7 TO 25

Step A: In accordance with the procedure of Step A in the foregoing examples, substituting the mercaptobenzimidazole shown in column A of Table I and the haloacid anilide shown in column B, the thioanilide shown in column C of Table I is obtained.

The mercaptobenzimidazole starting materials are prepared by reacting an R-substituted o-phenylenediamine with potassium ethyl xanthate.

Step B: The thioanilide of column C of Table I (also column A' of Table II) is then reacted with the halocarbonic acid ester shown in column B' of Table II in accordance with the procedure set out in Step B of the foregoing examples, to form the mercaptobenzimidazole product shown in column C' of Table II.

TABLE I

| | Column A | | Column B | | | | Column C | | |
|---|---|---|---|---|---|---|---|---|---|---|
| Example number | R (position) | n | X | Y | $R_1$ (position) | n' | n | R (position) | Y | $R_1$ (position) |
| 7 | H | --- | Cl | $(CH_2)_6$ | {2-I, 6-I} | 2 | | As in Column A | | As in Column B |
| 8 | 6-$NO_2$ | 1 | Br | —CH—$(CH_2)_3$—<br>   \|<br>   $C_2H_5$ | 3-$C_3H_5$ | 1 | | As in Column A | | As in Column B |
| 9 | 7-$C_3H_7$ | 1 | Cl | $CH_3$<br>   \|<br>—$(CH_2)_2$—C—$(CH_2)_2$—<br>   \|<br>   $CH_3$ | 3-$NO_2$ | 1 | | As in Column A | | As in Column B |
| 10 | 5-$C_2H_5O$ | 1 | Br | —$CH_2$— | 4-$C_2H_5O$ | 1 | | As in Column A | | As in Column B |
| 11 | 5-$C_2H_5$—C—NH—<br>         \|\|<br>         O | 1 | Cl | —$(CH_2)_4$— | 3-$NO_2$ | 1 | | As in Column A | | As in Column B |
| 12 | 6-$C_5H_{11}S$ | 1 | Br | —$(CH_2)_7$— | O<br>\|\|<br>4-$CH_3C$— | 1 | | As in Column A | | As in Column B |
| 13 | {6-Br, 5-Br} | 2 | Cl | —$(CH_2)_9$— | 3-$C_4H_9S$ | 1 | | As in Column A | | As in Column B |
| 14 | {5-CN, 6-CN} | 2 | Cl | —$(CH_2)_{11}$— | 4-F | 1 | | As in Column A | | As in Column B |
| 15 | 7-SCN | 1 | Cl | —$(CH_2)_{13}$— | {3-CN, 5-CN} | 2 | | As in Column A | | As in Column B |
| 16 | 6-$C_3H_7O$—C—CN<br>         \|\|<br>         O | 1 | Br | —$(CH_2)_{15}$— | 4-SCN | 1 | | As in Column A | | As in Column B |
| 17 | 5-$CF_3$ | 1 | Br | —CH—$CH_2$—<br>   \|<br>   $C_3H_7$ | O<br>\|\|<br>4-$CH_3NC$— | 1 | | As in Column A | | As in Column B |
| 18 | 5-$C_6H_5O$—C—<br>         \|\|<br>         O | 1 | Cl | $CH_3$<br>   \|<br>—$CH_2$—C—$CH_2$—<br>   \|<br>   $C_2H_5$ | {2-$CF_3$, 6-$CF_3$} | 2 | | As in Column A | | As in Column B |
| 19 | 4-$C_6H_5CNH$—<br>         \|\|<br>         O | 1 | Br | —$(CH_2)_2$—CH—$CH_2$—<br>                \|<br>                $C_2H_5$ | {2-$CH_3$, 4-$C_2H_5$} | 2 | | As in Column A | | As in Column B |
| 20 | 5-$(CH_3)_2N$ | 1 | Cl | —$CH_2$—C—$CH_2$—<br>          (cyclopentyl-S) | 4-Br | 1 | | As in Column A | | As in Column B |

TABLE I—Continued

| | Column A | | | Column B | | | | Column C | | | |
|---|---|---|---|---|---|---|---|---|---|---|---|
| | ![benzimidazole-SH structure with (R)n] | | | X—Y—C(=O)—NH—[phenyl-(R₁)n'] | | | | [benzimidazole]—S—Y—C(=O)—NH—[phenyl-(R₁)n'] | | | |
| Example number | R (position) | n | X | Y | R₁ (position) | n' | n | R (position) | Y | R₁ (position) | n |
| 21 | $C_2H_5$ 6-N—$(CH_2)_2$— $C_2H_5$ | 1 | Br | —$CH_2$—CH< $C_2H_5$ / $CH_3$ | 3-$(CH_3)_2$N— | 1 | | As in Column A | As in Column B | As in Column B | |
| 22 | 7-$CH_3$ | | | —$CH_2$—[thiophene] | 4-N< $C_2H_5$ / $CH_3$ ; 4-N—$(CH_2)_4$ $CH_3$ | | 1 | As in Column A | As in Column B | As in Column B | |
| 23 | 5-$C_6H_5CH_2$— | 1 | Br | —$(CH_2)_2$— | 4-$C_6H_{11}NH$— | 1 | 1 | As in Column A | As in Column B | As in Column B | |
| 24 | 6-$C_2H_5$ | 2 | Br | —$CH_2$— | 4-$CH_3O$— | 1 | 1 | As in Column A | As in Column B | As in Column B | |
| 25 | 7-$C_6H_5C(=O)$ | 1 | Cl | —$CH_2$— | 4-$CH_3C(=O)$— | 1 | 1 | As in Column A | As in Column B | As in Column B | |

TABLE II

| | Column A' | | | Column B' | | Column C' | | | |
|---|---|---|---|---|---|---|---|---|---|
| | [benzimidazole-(R)n]—S—Y—C(=O)—NH—[phenyl-(R₁)n'a] | | | $R_2COX$ | | [benzimidazole-(R)n]—S—Y—C(=O)—N(COR₂)—[phenyl-(R₁)n'] | | | |
| Example No. | n | R (position) | Y | R₁ (position) | n' | R₂ | X | n | R₂ |
| 7 | | H | $(CH_2)_5$ | {2-I / 6-I} | 2 | $CH_3O$ | Cl | As in Column A' | As in Column A' | As in Column B' |
| 8 | 1 | 6-$NO_2$ | —CH—$(CH_2)_2$— $C_2H_5$ | 3-$CH_3$ | 1 | $C_2H_5O$ | Br | As in Column A' | As in Column A' | Do. |
| 9 | 1 | 7-$C_3H_7$ | $CH_3$ —$(CH_2)_2$—C—$(CH_2)_2$— $CH_3$ | 3-$NO_2$ | 1 | $C_3H_7O$ | Cl | As in Column A' | As in Column A' | Do. |

3,720,686

TABLE II—Continued

| | Column A' | | | | Column B' | | Column C' | | |
|---|---|---|---|---|---|---|---|---|---|
| | \[benzothiazole-S-Y-C(=O)-NH-phenyl(R₁)ₙ'\] | | | | R₂COX | | \[benzothiazole-S-Y-C(=O)-NH-phenyl with C(=O)R₂ on N\] | | |
| Example No. | n R (position) | Y | n' R₁ (position) | | n' R₂ | X | n R (position) | n' R₁ (position) | R₂ |
| 10 | 1 5-C₂H₅O | —CH₂— | 1 4-C₂H₅O | | 1 \[thiophene-O—\] | Br | As in Column A' | As in Column A' | As in Column B'. |
| 11 | 1 5-C₂H₅-O-C(=O)-NH— | —(CH₂)₄— | 1 3-NO₂ | | 1 \[tetrahydropyran-O—\] | Cl | As in Column A' | As in Column A' | Do. |
| 12 | 1 6-C₅H₁₁S | —(CH₂)₇— | 1 4-CH₃O-C(=O)— | | 1 \[tetrahydrothiophene-O—\] | Cl | As in Column A' | As in Column A' | Do. |
| 13 | 2 {6-Br, 5-Br} | —(CH₂)₉— | 1 3-C₄H₉S | | 1 C₆H₅C₂H₄O— | Br | As in Column A' | As in Column A' | Do. |
| 14 | 2 {5-CN, 6-CN} | —(CH₂)₁₁— | 1 4-F | | 1 C₆H₅O— | Br | As in Column A' | As in Column A' | Do. |
| 15 | 1 7-SCN | —(CH₂)₁₅— | {3-CN, 5-CN} | | 2 C₃H₇O— | Cl | As in Column A' | As in Column A' | Do. |
| 16 | 1 6-C₃H₇O-O-C(=O)— | —(CH₂)₁₃— | 1 4-SCN | | 1 C₆H₅CH₂O— | Cl | As in Column A' | As in Column A' | Do. |
| 17 | 1 5-CF₃ | —CH—CH₂—, C₃H₇ | 1 4-CH₃O-C(=O)— | | 1 \[cycloheptane-O—\] | Br | As in Column A' | As in Column A' | Do. |
| 18 | 1 5-C₆H₅O-C(=O)— | —CH₂—C(CH₃)(C₂H₅)—CH₂— | 1 {2-CF₃, 5-CF₃} | | 2 \[cyclohexane-O—\] | Br | As in Column A' | As in Column A' | Do. |
| 19 | 1 4-C₆H₅C(=O)NH— | —(CH₂)₂—CH—CH₂—, C₄H₉ | 1 {2-CH₃, 4-C₂H₅} | | 2 \[tetrahydrothiophene-O—\] | Cl | As in Column A' | As in Column A' | Do. |
| 20 | 1 5-(CH₃)₂N | —CH₂—C(CH₃)—\[thiophene\] | 1 4-Br | | 1 \[tetrahydrothiophene-O—\] | Br | As in Column A' | As in Column A' | Do. |

TABLE II—Continued

Column A′:

$$\underset{(R)_n}{\boxed{\begin{array}{c}N\\3\\4\\5\\6\\7\end{array}}}\!\!-\!\!\underset{H}{\overset{2}{N}}\!\!-\!\!S\!\!-\!\!Y\!\!-\!\!\overset{O}{\underset{\|}{C}}\!\!-\!\!NH\!\!-\!\!\boxed{\phantom{X}}\!\!-(R_1)_{n'}$$

Column B′: $R_2COX$

Column C′:

$$\underset{(R)_n}{\boxed{\phantom{X}}}\!\!\begin{array}{c}N\\\\N\\|\\C=O\\|\\R_2\end{array}\!\!-\!\!S\!\!-\!\!Y\!\!-\!\!\overset{O}{\underset{\|}{C}}\!\!-\!\!NH\!\!-\!\!\boxed{\phantom{X}}\!\!-(R_1)_{n'}$$

| Example No. | n | R (position) | Y | $R_1$ position | n′ | $R_2$ | X | n | R (position) | $R_1$ (position) | n′ | $R_2$ |
|---|---|---|---|---|---|---|---|---|---|---|---|---|
| 21 | 1 | $C_2H_5$ 6-{$N-(CH_2)_3-$ $C_2H_5$} | $\begin{array}{c}C_2H_5\\|\\-CH_2-C-\\|\\CH_3\end{array}$ | 3-$(CH_3)_2N-$ | 1 | $\boxed{\begin{array}{c}O\\S\end{array}}$ | Br | | As in Column A′ | As in Column A′ | | As in Column B′ |
| 22 | | | $-\boxed{S}$ | 4-$\begin{array}{c}CH_3\\|\\N-(CH_2)_4-\\|\\CH_3\end{array}$ | 1 | $C_4H_9O$ | Cl | | As in Column A′ | | | Do. |
| 23 | | | $-CH_2-CH-$ $C_2H_5$ | 4-$C_6H_{13}NH-$ | 1 | $C_6H_5CH_2O$ | Cl | | As in Column A′ | | | Do. |
| 24 | | | $\{\begin{array}{c}-(CH_2)_{11}-\\-CH_2-\end{array}$ | 4-$CH_3O-$ | 2 | $C_5H_{11}O$ | Cl | | As in Column A′ | | | Do. |
| 25 | 1 | 7-$C_6H_5C-$ $\|$ $O$ | $-CH_2-$ | 4-$CH_3C-$ $\|$ $O$ | 1 | $C_4H_9O$ | Cl | | As in Column A′ | | | Do. |

What is claimed is:
1. A compound of the formula:

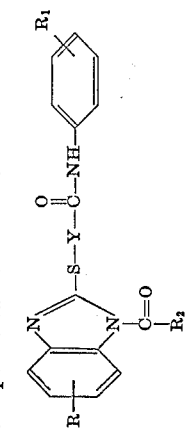

wherein R and $R_1$ are the same or different and are selected from the group consisting of hydrogen, lower alkyl, lower alkoxy, lower alkylthio, trifluoromethyl, nitro, halogen, lower alkylamino and di(lower alkyl)amino; $R_2$ is selected from the group consisting of lower alkoxy, cycloalkoxy of from four to seven carbon atoms, phenoxy and benzyloxy and Y is straight chain alkylene of from one to five carbon atoms which may or may not be substituted by one or two alkyl groups of from one to five carbon atoms.

2. A compound in accordance with claim 1 wherein $R_2$ is ethoxy, R is hydrogen, Y is methylene and $R_1$ is 4-cl.

3. A compound in accordance with claim 1 wherein $R_2$ is ethoxy, R is hydrogen, Y is methylene, and $R_1$ is 4-$CH_3$.

4. A compound in accordance with claim 1 wherein $R_2$ is ethoxy, R is hydrogen, Y is methylene and $R_1$ is 4-$NO_2$.

5. A compound in accordance with claim 1 wherein $R_2$ is ethoxy, Y is methylene, R is 5-$NO_2$, and $R_1$ is hydrogen.

6. A compound in accordance with claim 1 wherein R is hydrogen, $R_2$ is ethoxy, Y is methylene, and $R_1$ is hydrogen.

References Cited

UNITED STATES PATENTS 3,558,775   1/1971   Fournier _____ 260—309.2

FOREIGN PATENTS 2,003,841   7/1970   Germany _____ 260—309.2

OTHER REFERENCES

Banks et al.: Chem. Abst., vol. 69, No. 965402 (1968).
Nakajima et al.: J. Pharm. Soc., Japan, vol. 78, pp. 1378–82 (1958).

NATALIE TROUSOF, Primary Examiner

U.S. Cl. X.R.

260—454, 465 E, 471 R, 562 B, 562 R, 570.8 R, 570.9, 574, 577, 578; 424—273